United States Patent [19]

Diepers et al.

[11] 3,783,503

[45] Jan. 8, 1974

[54] METHOD OF PRODUCING A COMPOSITE CONDUCTOR BAND FOR USE IN MAKING A TUBULAR SUPERCONDUCTOR

[75] Inventors: Heinrich Diepers, Erlangen-Bruck; Horst Musebeck, Erlangen, both of Germany

[73] Assignee: Siemens Aktiengesellschaft, Munich, Germany

[22] Filed: Aug. 10, 1972

[21] Appl. No.: 279,385

[30] Foreign Application Priority Data

Nov. 2, 1971 Germany .................. P 21 54 452.5

[52] U.S. Cl. ......... 29/599, 174/126 CP, 174/DIG. 6

[51] Int. Cl. ......................................... H01v 11/00

[58] Field of Search ................ 29/599; 174/126 CP, 174/DIG. 6; 335/216

[56] References Cited

UNITED STATES PATENTS

| | | | |
|---|---|---|---|
| 3,507,038 | 4/1970 | Moll et al. | 29/599 |
| 3,548,078 | 12/1970 | Albrecht et al. | 29/599 X |
| 3,591,705 | 7/1971 | Grigsby et al. | 335/216 X |
| 3,657,466 | 4/1972 | Woolcock et al. | 174/DIG. 6 |
| 3,699,647 | 10/1972 | Bidault et al. | 29/599 |

FOREIGN PATENTS OR APPLICATIONS

| | | | |
|---|---|---|---|
| 1,952,148 | 8/1970 | Germany | 29/599 |

*Primary Examiner*—Charles W. Lanham
*Assistant Examiner*—D. C. Reiley, III
*Attorney*—Hugh A. Chapin

[57] ABSTRACT

A method for producing a conductor band which includes a layer of niobium adjacent a layer of an electrically normal conducting metal and respective ribbon-like niobium chords defining the longitudinal edges of the band. The conductor band is produced by joining niobium chords to the longitudinal narrow sides of a niobium strip respectively to form a niobium band having a U-shaped profile, each of the chords having a thickness greater than the thickness of the strip, at least approximately filling the space bounded by the inside surface of the U-shaped niobium band with an electrically normal conducting metal, and then joining the normal conducting metal to the U-shaped niobium band to form the conductor band. The conductor band made in this manner is used in a method of producing a tubular conductor for superconducting cables and the like.

6 Claims, 3 Drawing Figures

METHOD OF PRODUCING A COMPOSITE CONDUCTOR BAND FOR USE IN MAKING A TUBULAR SUPERCONDUCTOR

BACKGROUND OF THE INVENTION

The invention relates to a method of producing a conductor band used in a method of producing tubular conductors for superconducting cables and the like.

More particularly, the invention relates to a method of producing a conductor band from which tubular conductors can be made in accordance with the method disclosed in patent application Ser. No. 279,388, filed Aug. 10, 1972, by Hans Pfister and Heinrich Diepers.

The subject of the patent application referred to above is a method of producing tubular conductors which include a niobium layer and a layer of electrically normal-conducting metal, preferably copper. The tubular conductors are especially suitable for superconducting cables. In this method a band is first produced which comprises the two layers and is provided with niobium chords at its edges. The band is then bent to form a tube in such a manner that the niobium chords disposed at the two edges of the strip mutually abut at their free lateral surfaces. Subsequently, the mutually adjacent surfaces of the niobium chords are joined together, preferably by means of electron-beam welding. A particular feature of the method are steps for manufacturing the bimetal band wherein respective niobium chords are welded to the two edges of a niobium foil strip by means of electron-beam welding in such a manner that a niobium band of U-shaped cross-section is produced. The free space of the U-shaped cross-section is filled at least partially with the normal-conducting metal. Subsequently, the metal is joined to the niobium strip and to the lateral chords under the action of heat.

The conductor band used to make the tubular conductor as described above and in the patent application referred to can be made according to a number of different methods in addition to those disclosed therein.

SUMMARY OF THE INVENTION

It is an object of the invention to provide another method of producing a conductor band used for making a tubular conductor for superconducting cables and the like.

According to a feature of the invention, the conductor band is produced by joining niobium chords to the longitudinal narrow sides of a niobium strip respectively to form a niobium band having a U-shaped profile, each of the chords having a thickness greater than the thickness of the strip, at least approximately filling the space bounded by the inside surface of the U-shaped niobium band with an electrically normal-conducting metal, and then joining the normal-conducting metal to the U-shaped niobium band to form the conductor band.

Joining the narrow sides of the niobium strip with the thicker ribbon-like members is preferably accomplished by electron-beam welding. The ribbon-like members serve as chords and have preferably a rectangular or quadratic cross-section. For joining the normal-conducting material placed in the U-shaped section with the same, almost any heat treatment in vacuum is suitable. In this connection, the U-shaped section serves as a melting mold for the normal-conducting metal which is preferably copper.

Because the nature of the surfaces of the two materials effects the process of joining the mutually adjacent surfaces together, it is advantageous to subject the already prepared materials to a surface cleaning process before they are joined by a heat treatment.

Although the invention is illustrated and described herein as a method of producing a conductor band for use in making a tubular conductor for superconducting cables and the like, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS

Figure 1:
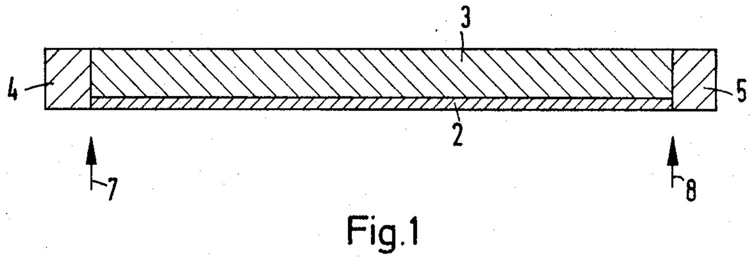
FIG. 1 illustrates a transverse cross-section of a conductor band produced according to the method of the invention.

Referring to FIG. 1, a thin niobium strip 2 is joined at its narrow sides to the respective niobium conductor chords 4 and 5. Niobium chords 4 and 5 are preferably of rectangular cross-section and have a thickness greater than that of the niobium strip. These niobium conductor chords 4 and 5 are joined to the niobium strip 2 preferably by means of electron-beam welding. For this purpose, an electron beam is in each instance directed as indicated by arrows 7 and 8 onto the mutually adjacent surfaces of the parts 2, 4 and 5 to form a niobium band having a U-shaped cross-section. In lieu of electron-beam welding, the parts 2, 4 and 5 can be joined together, for example, by arc welding in an atmosphere of protective gas. After joining the parts 2, 4 and 5, the surfaces of the U-shaped section consisting of the parts 2, 4 and 5 can be additionally subjected to treatment if required and then filled with the normal-conducting material 3, preferably, copper.

Figure 1A:
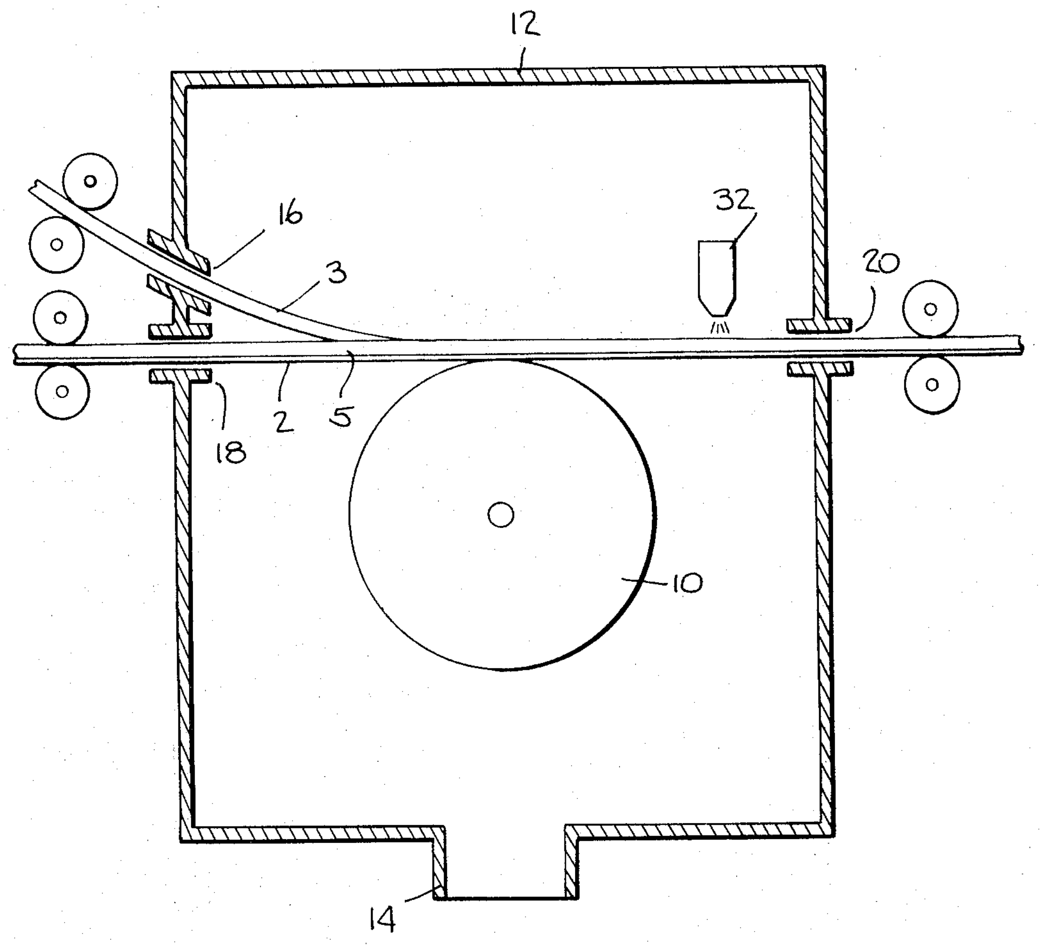
FIG. 1A illustrates the steps of filling the free space of a U-shaped niobium section with a strip of normal-conducting metal and joining the section to the normal-conducting metal. The niobium section and normal-conducting metal are shown being passed through a heat treatment facility.

For this purpose, a flat copper or aluminum strip having a cross-section corresponding approximately to the inside space bounded by the U-shaped section can be placed therein and joined thereto by a heat treatment so that a diffusion bond is formed between the mutually adjacent surfaces of the niobium and copper. To form this bond, the niobium U-shaped section consisting of parts 2, 4 and 5 and the strip 3 are directed into and through the evacuated housing 12 of a welding facility by means of a transport mechanism 10 and rollers at the inlets and outlet of the housing as shown in FIG. 1A. The housing 12 has connection stub 14 as well as vacuum-tight feedthroughs 16 and 18 for the strip of normal conducting metal 3 and the U-shaped section as well as a feedthrough 20 for the composite conductor band. In housing 12 there is arranged a specially constructed electron-beam device 32 in the form of an electron gun which generates a linearly shaped electron beam that extends transversely across the width of the transported band, the band at the beam being a composite band of chords 4 and 5, the strip 2 and the copper strip 3. The beam intensity of the electron gun 32 and the transport velocity of the transport mechanism 10 are matched in such a manner that the copper is melted in a small area across the width of the niobium strip thereby forming a diffusion bond between the copper strip 3 and the niobium strip 2 as well as between the strip 3 and the adjacent chords 4 and 5.

Instead of a metal strip, individual rods of a desired cross-section may be placed into the U-shaped niobium section and joined together as well as to the niobium.

Figure 2:
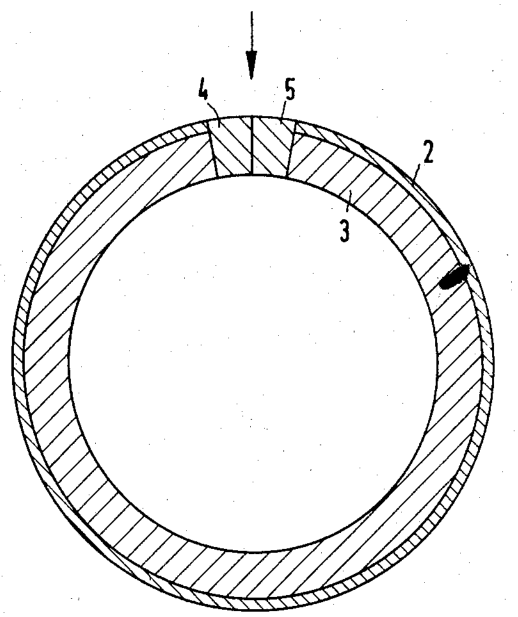
FIG. 2 illustrates a sectional view of a tubular conductor made with a conductor band produced according to the method of the invention.

The finished bimetal strip is then bent to form the tube shown in FIG. 2 so that the free lateral surfaces of the chords 4 and 5 which face away from the strip 2 butt against each other. The mutually adjacent lateral surfaces of the chords 4 and 5 are then joined together, the joint being preferably made by means of an electron beam, as indicated in FIG. 2 by the arrow.

For producing the niobium U-shaped section in accordance with the method of the invention, it is preferable to use niobium strip of a thickness of at least 0.1 mm customarily available in the form of processed sheet metal. It is however more preferable if the sheet has a thickness of at least 0.3 mm, and most preferable if the thickness is more than 1 mm. In general, the thickness of the strip used should not be much over 5 mm. The U-shaped section filled with the normal-conducting material is subsequently rolled until it is flattened to a desired thickness in dependence upon the application of the finished conductor.

What is claimed is:

1. In a method of producing a tubular conductor for superconducting cables from a bimetal conductor band having a layer of niobium adjacent a layer of an electrically normal conducting metal and having respective ribbon-like niobium chords which define the longitudinal edges of the band; the tubular conductor being made by bending the band to cause the niobium chords to mutually abut thereby forming a tube, and then metallurgically bonding the mutually abutting niobium chords to each other; the improvement comprising producing the bimetal conductor band by the steps of metallurgically bonding a nibium chord to each of the two longitudinal narrow sides of a niobium strip respectively to form a niobium band having a U-shaped profile whereby leg portions of the U-shape are defined entirely by the chords, each of the chords having a thickness greater than the thickness of the strip; at least approximately filling the space bounded by the inside surface of the U-shaped niobium band with an electrically normal-conducting metal; and then metallurgically bonding the normal-conducting metal to the U-shaped niobium band to form the bimetal conductor band.

2. The method of claim 1 wherein the niobium chords are bonded to the niobium strip by directing an electron beam in each instance onto the respective regions of the mutually adjacent surfaces of the chords and the strip.

3. The method of claim 1 wherein the niobium strip is a niobium sheet having a thickness of at least approximately 0.3 mm.

4. The method of claim 3 wherein after the normal conducting metal is bonded to the U-shaped niobium band the conductor band is reduced to a desired thickness by rolling.

5. The method of claim 1 wherein the niobium strip is a niobium sheet having a thickness of at least approximately 1 mm.

6. The method of claim 5 wherein after the normal conducting metal is bonded to the U-shaped niobium band the conductor band is reduced to a desired thickness by rolling.

* * * * *